(12) United States Patent
Cund et al.

(10) Patent No.: US 10,300,852 B2
(45) Date of Patent: May 28, 2019

(54) WATER DEPTH ESTIMATION APPARATUS AND METHOD

(71) Applicant: Jaguar Land Rover Limited, Whitley Coventry Warwickshire (GB)

(72) Inventors: Mark Cund, Inkberrow (GB); Paul Widdowson, Kenilworth (GB); Jim O'Donoghue, Leamington Spa (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 78 days.

(21) Appl. No.: 14/915,958

(22) PCT Filed: Sep. 2, 2014

(86) PCT No.: PCT/EP2014/068600
§ 371 (c)(1),
(2) Date: Mar. 2, 2016

(87) PCT Pub. No.: WO2015/032746
PCT Pub. Date: Mar. 12, 2015

(65) Prior Publication Data
US 2016/0196656 A1  Jul. 7, 2016

(30) Foreign Application Priority Data

Sep. 3, 2013 (GB) .................................. 1315613.8

(51) Int. Cl.
*B60R 1/00* (2006.01)
*B60W 40/06* (2012.01)
(Continued)

(52) U.S. Cl.
CPC ................ *B60R 1/00* (2013.01); *B60R 11/04* (2013.01); *B60W 40/06* (2013.01); *G01B 11/22* (2013.01);
(Continued)

(58) Field of Classification Search
CPC  G06T 7/0051; G06T 7/50; B60R 1/00; B60R 11/04; B60R 2300/30;
(Continued)

(56) References Cited

U.S. PATENT DOCUMENTS 9,026,310 B2  5/2015  Tran et al.
9,227,479 B2  1/2016  Clarke et al.
(Continued)

FOREIGN PATENT DOCUMENTS

EP    2698299 A1    2/2014
FR    2985236 A1 *  7/2013    ............ B60W 50/14
(Continued)

OTHER PUBLICATIONS

Combined Search and Examination Report corresponding to application No. GB1315613.8, dated Mar. 24, 2014, 6 pages.
(Continued)

*Primary Examiner* — Jamie J Atala
*Assistant Examiner* — Ayman A Abaza
(74) *Attorney, Agent, or Firm* — Reising Ethington P.C.

(57) ABSTRACT

A land-based automotive vehicle comprising an apparatus for estimating the depth of water about the vehicle. The apparatus comprising at least one light source, at least one imaging means such as a camera mounted to the vehicle and a control unit, the apparatus being structured and arranged such that a first light signal is emitted toward a water surface about the vehicle, the at least one camera is configured for imaging the first light signal and the control unit is configured and arranged to compute from the imagery obtained by the at least one camera an estimation of a depth of water about the vehicle.

21 Claims, 5 Drawing Sheets

(51) Int. Cl.
*G01F 23/292* (2006.01)
*G01S 17/46* (2006.01)
*G01C 13/00* (2006.01)
*B60R 11/04* (2006.01)
*G01B 11/22* (2006.01)
*G06K 9/00* (2006.01)
*G06T 7/50* (2017.01)

(52) U.S. Cl.
CPC ......... *G01C 13/008* (2013.01); *G01F 23/292* (2013.01); *G01F 23/2928* (2013.01); *G01S 17/46* (2013.01); *G06K 9/00791* (2013.01); *G06T 7/50* (2017.01); *B60R 2300/30* (2013.01); *B60R 2300/80* (2013.01); *B60W 2420/42* (2013.01); *G06T 2207/30248* (2013.01); *Y02A 90/32* (2018.01)

(58) Field of Classification Search
CPC .......... B60R 2300/80; B60W 2420/42; B60W 40/06; G01B 11/22; G01C 13/008; G01F 23/292; G01F 23/2928; G01S 17/46; G06K 9/00791
USPC .......................................................... 348/148
See application file for complete search history.

(56) References Cited

U.S. PATENT DOCUMENTS

| 2009/0187378 | A1* | 7/2009 | Kusunose | G01B 11/22 |
| | | | | 702/166 |
| 2013/0030685 | A1 | 1/2013 | Goetting | |
| 2014/0146303 | A1* | 5/2014 | Mitchell | G01S 17/08 |
| | | | | 356/5.01 |
| 2014/0184800 | A1* | 7/2014 | Hirai | G01N 21/958 |
| | | | | 348/148 |

FOREIGN PATENT DOCUMENTS

| GB | 2486577 A | | 6/2012 | |
| GB | 2489109 A | | 9/2012 | |
| JP | S5582068 A | | 6/1980 | |
| JP | 2006303858 A | * | 11/2006 | ............... H04N 7/18 |
| JP | 2008217267 A | | 9/2008 | |

OTHER PUBLICATIONS

International Search Report corresponding to International application No. PCT/EP2014/068600, dated Nov. 3 2014, 4 pages.
Written Opinion corresponding to International application No. PCT/EP2014/068600, dated Nov. 3, 2014, 8 pages.

* cited by examiner

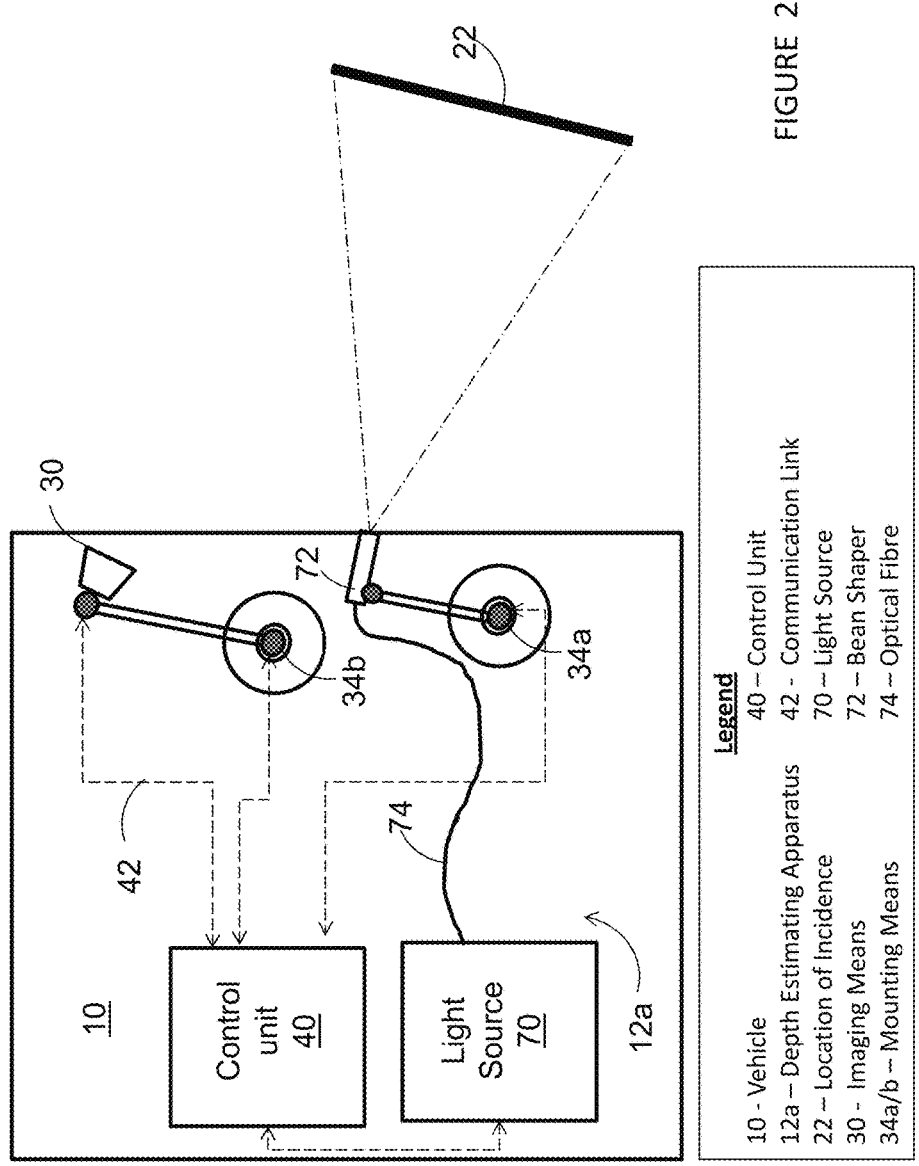

WATER DEPTH ESTIMATION APPARATUS AND METHOD

TECHNICAL FIELD

The present invention relates to an apparatus for estimating depth of water and to a method of estimating depth of water. Additionally and more specifically, but not exclusively, the invention relates to a land-based automotive vehicle having an apparatus for estimating the depth of water ahead of the direction of travel of the vehicle. Embodiments of the invention may be beneficial for protecting a vehicle from damage that might occur if the vehicle is driven through water of too great a depth, and/or for preparing a land-based automotive vehicle intended for wading through water before the vehicle enters the water so that the vehicle approaches the water in a state of readiness. Aspects of the invention relate to a vehicle, an apparatus and a method.

BACKGROUND

Land-based vehicles are able to travel through a body of water to a finite depth, which may be referred to as a maximum wading depth. The maximum wading depth of a vehicle is very much dependent upon the design of the vehicle.

For example, it is common for off-road type vehicles to be configured such that they can be driven through a body of water of significant depth, for example 500 mm, 700 mm or more. Driving through a body of water having a significant depth is often referred to as wading. Driver caution and judgement is required when a vehicle is wading or is about to enter into a wading scenario. This is because a vehicle driver typically does not know the depth of water that the vehicle is about to enter or the nature of the terrain below the water surface. It is recommended that a survey of the terrain is taken by wading through water on foot, but factors such as the variability of the terrain; low visibility conditions; inconvenience to the driver; and driver impatience may result in a driver attempting to traverse water without knowledge of the water depth and therefore without being able to take appropriate precautions. Furthermore, the nature of the terrain may be variable and a full picture of the terrain and changing water depth may not be gathered very effectively by a vehicle driver wading through water on foot.

In other vehicle examples, such as sports models, a vehicle may not be specifically designed for wading and the position of water sensitive components and/or inlets, such as the air intake, may be relatively low. The maximum wading depth of such a vehicle may be only about 200 mm or 250 mm. For such vehicles there is a risk that the vehicle engine and electronics may be damaged even if the vehicle is driven through a body of water of relatively low depth, for example 200 mm or even less (due to displacement of the water as the vehicle travels through it).

It is therefore desirable to obtain accurate information relating to the environment a vehicle is currently in, or is about to enter. It is of particular advantage to ascertain, in advance of a vehicle being disposed in a body of water, an estimation of the depth of that body of water. Such information may be: conveyed to the driver to improve driver control during vehicle wading; used to manually or automatically activate one or more vehicle control mechanisms which may be used to prepare and/or protect the vehicle as it goes into a wading situation; and/or used to alert the driver to a potentially vehicle damaging situation, to guide the driver to cease the progression of the vehicle towards the water or further into the water.

Embodiments of the present invention seek to provide an improvement in the field of liquid (particularly, water) depth estimation systems that has particular application for vehicles and, more specifically but not exclusively, to land-based automotive vehicles. Embodiments of the invention may be utilised in applications other than for vehicles; for example, it is envisaged that embodiments of the invention may have application in buildings, for example domestic houses, where the automatic detection of water at a certain level may be useful. Such a system may be adapted, for example, to effect automatic deployment of flood defence systems. The invention may be utilised in un-manned vehicles.

SUMMARY OF THE INVENTION

Aspects of the invention provide a land-based automotive vehicle, an apparatus and a method as claimed in the appended claims.

According to a further aspect of the invention for which protection is sought, there is provided a land-based automotive vehicle comprising an apparatus for estimating the depth of water about the vehicle, the apparatus comprising a light emitter, an imaging means and a control unit, wherein the light emitter is configured to emit a first light signal directed toward a water surface about the vehicle, the imaging means is configured to image the first light signal emitted by the light emitter and the control unit is configured to compute from imagery obtained by the at least one imaging means an estimation of depth of the water about the vehicle.

The at least one imaging means may comprise at least one camera.

Optionally, the imaging means comprises a first camera configured to detect or image one or more locations of incidence of the first light signal on a water surface and wherein the first or another camera is configured to detect or image one or more locations of incidence of a second light signal on a ground surface, wherein the second light signal is a refracted portion of the first light signal and wherein the control unit derives a height of the water surface above the ground level in dependence upon a determined distance between the one or more locations of incidence of the first light signal on the water surface, and the one or more locations of incidence of a corresponding refracted second light signal on the ground surface.

Optionally, said determined distance is determined by said control unit by counting a maximum or average number of pixels between the one or more locations of incidence of the first light signal on the water surface and the one or more locations of incidence of a corresponding refracted second light signal on the ground surface.

The at least one light emitter optionally comprises a light source and a beam shaper element. Additionally, the beam shaper element may comprise any one or a combination of: a lens, a collimator, a diffuser, a mask or a gobo.

The first light signal is optionally a shaped light signal, and is shaped such that said one or more locations of incidence of the first light signal on the water surface is shaped as a line. The line may be a horizontal straight line spaced from the front end of the vehicle or spaced from the rear end of the vehicle.

The light source optionally comprises one or more coherent light sources. The one or more coherent light sources may comprise one or more or a combination of: a blue laser, a green laser, or a UV laser.

An optical fibre may additionally be provided for coupling light between the one or more light sources and the beam shaper element.

Optionally, the apparatus comprises a moveable mounting means for mounting a portion of the optical fibre and/or the beam shaper element to the vehicle and wherein the mounting means moves the optical fibre and/or the beam shaper element to change the position relative to the vehicle from which the first light signal is emitted.

Advantageously such a mounting means may enable the position of the light source to be controlled and changed in order to control the position of incidence of the first light signal on a water surface.

Optionally, the apparatus comprises one light source, a first optical fibre and a first beam shaper element, the optical fibre and/or the beam shaper element being mounted via a first moveable mounting means to the front of the land-based vehicle, and wherein the apparatus is structured and arranged such that the first light signal is scanned in front of the vehicle in: a substantially linear pattern or in a substantially arcuate pattern. Optionally by scanning the light sources a series of depth measurements may be obtained. The series of depth estimations may be averaged, or the "worst case" of which may be used in guiding the driver or in activating control systems of the vehicle.

Additionally or alternatively, the apparatus may further comprise a second optical fibre and a second beam shaper element for emitting a further light signal from the land-based vehicle, the second optical fibre and/or the second beam shaper element being mounted via a second moveable mounting means to the rear of the land-based vehicle and wherein the apparatus is structured and arranged such that the further light signal is scanned to the rear of the vehicle in: a substantially linear pattern or in a substantially arcuate pattern.

The apparatus may be manually activated by a driver of the vehicle. In this way the control unit is only requested to make an estimation of a water depth based upon a light signal incident upon a surface and a refracted portion of that light signal being incident upon a different (ground) surface when the likelihood of water being present about the vehicle is highly likely. This avoids the complexities associated with either trying to compute a depth when no water is present and/or trying to determine automatically, with a high degree of confidence, that water is disposed about the vehicle.

The apparatus is optionally positioned on the vehicle such that the apparatus is suitable for estimating the depth of a body of water ahead of the direction of travel of the vehicle, in front of the vehicle, to the rear of the vehicle and/or to one or both of the sides of the vehicle.

The maximum wading depth of the vehicle may be about 150 mm or more. As such, the apparatus may be used on "on-road" type vehicles and sports models, wherein the air in-take is low and the depth of water that the vehicle can travel through is also low (compared to, say, an off-road type vehicle). The present invention thereby provides an apparatus that may protect high-value vehicles from damage and provide a beneficial feature to a driver of such a vehicle by giving the driver confidence in knowing that it is or is not appropriate to proceed through road water of unknown depth that may, in fact, have a depth sufficient enough to cause serious and costly damage to such a vehicle.

According to an even further aspect of the invention for which protection is sought, there is provided an apparatus for estimating depth of water, the apparatus comprising at least one light emitter, at least one imaging means and a control unit, the at least one light emitter being structured and arranged such that a first light signal emitted by the at least one light emitter is directed toward a water surface, the at least one imaging means being configured and arranged for imaging the first light signal, and the control unit being configured to compute from imagery obtained by the at least one imaging means an estimation of a depth of water.

Optionally, said determined distance is determined by said control unit by counting a maximum or average number of pixels between the one or more locations of incidence of the first light signal on the water surface and the one or more locations of incidence of a corresponding refracted second light signal on the ground surface. The counted number of pixels may be converted into a distance in appropriate measurement units (for example meters) based upon the resolution of the imaging means and/or based upon one or more scale factors or calibration factors.

Optionally, the at least one imaging means comprises at least one camera.

The apparatus may comprise a first camera configured to detect one or more locations of incidence of the first light signal on a water surface and wherein the first or another camera is configured to detect one or more locations of incidence of a second light signal on a ground surface, wherein the second light signal is a refracted portion of the first light signal and wherein the control unit derives a height of the water surface above the ground level in dependence upon the distance between the one or more locations of incidence of the first light signal on the water surface, and the one or more locations of incidence of a corresponding refracted second light signal on the ground surface.

Optionally, the one or more coherent light sources comprises one or more or a combination of: a blue laser, a red laser, an infra-red laser, a green laser and a UV laser. Preferably a blue light or Ultra-Violet light source is used. Such laser light sources may have a wavelength that is less susceptible to attenuation by the water, particularly if the water is muddy and unclear and/or such laser light sources may be more clearly imaged by the camera in bright daylight conditions and/or darker night conditions.

According to yet another aspect of the invention, there is provided a method of estimating the depth of water about a vehicle, the method comprising: emitting a first light signal toward a water surface about the vehicle; imaging the first light signal to obtain imagery; and computing from said imagery an estimation of a depth of water about the vehicle.

Optionally, the method may comprise imaging one or more locations of incidence of the first light signal on a water surface and imaging one or more locations of incidence of a second light signal on a ground surface, wherein the second light signal is a refracted portion of the first light signal and wherein the method may comprise deriving an estimation of the height of the water surface above the ground level in dependence upon a detected distance between the one or more locations of incidence of the first light signal on the water surface and the one or more locations of incidence of a corresponding refracted second light signal on the ground surface.

Further optionally, the first light signal is a shaped light signal such that the one or more locations of incidence of the first light signal on the water surface is shaped as a line.

Throughout the specification reference is made to the term water. It will be understood that in the context of a land-based vehicle driving through water, the term "water" is intended to encompass all liquid media that a land-based vehicle may drive through and is not limited in its interpretation to pure $H_2O$. For example, as used herein water may mean, but not limited to: a muddy river bed; sea-water; a ford; and dirty water in off-road terrain.

The methods, algorithms and control processes described herein can be machine-implemented. The methods, algorithms and control processes described herein can be implemented on one or more computational device(s) comprising one or more processors, for example, an electronic microprocessor. Such processor(s) may be configured to perform computational instructions stored in memory or in a storage device accessible by the processor(s).

Within the scope of this application it is expressly intended that the various aspects, embodiments, examples and alternatives set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which:

FIG. 2 is a schematic illustration of an apparatus according to an embodiment of the invention at least partially disposed within a vehicle;

DETAILED DESCRIPTION OF EMBODIMENTS

Detailed descriptions of specific embodiments of the vehicles, apparatus and methods of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the vehicles, apparatus and methods described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1A:
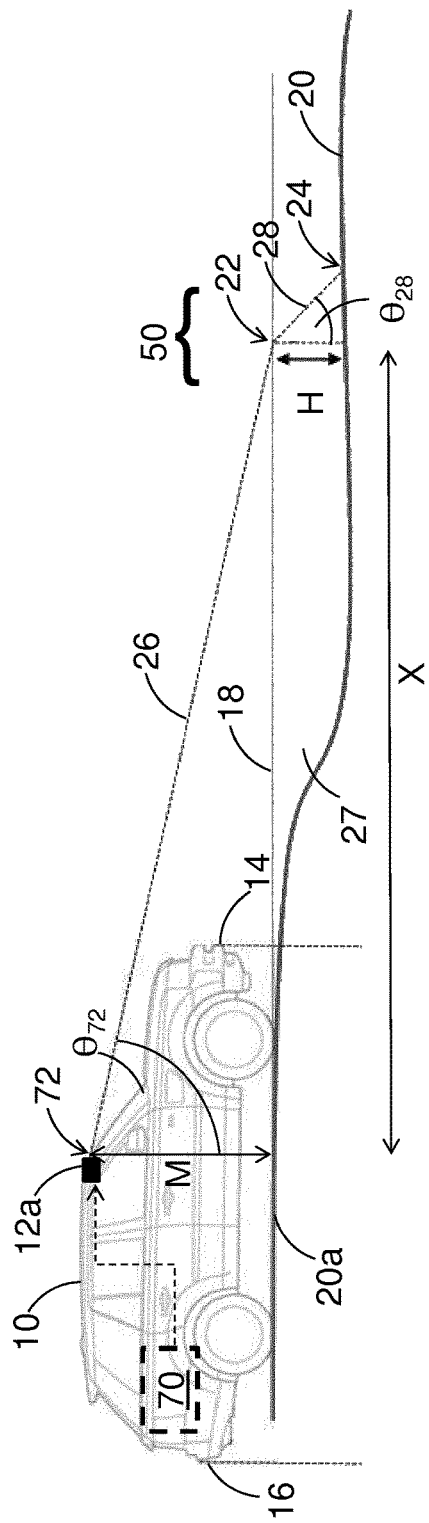
FIG. 1A is a side view of a land-based vehicle having an apparatus for water depth estimation according to an embodiment of the invention.

Referring to FIG. 1A a land-based automotive vehicle 10, optionally of the off-road type, is shown having an apparatus 12a for estimating a depth of a body of water 18 ahead of the direction of travel of the vehicle 10. The vehicle 10 may have been travelling in the forwards direction towards the body of water 18 but at the time of illustration in FIG. 1A, the vehicle 10 is held stationary and a driver of the vehicle (not shown) has manually activated the apparatus 12a in order to determine an estimation of the water depth before deciding whether to progress the vehicle 10 through the water 18.

The apparatus 12a is disposed closer to a front end 14 of the vehicle 10, than it is to a rear end 16 of the vehicle 10. Optionally, the apparatus 12a is partially mounted to the vehicle 10 at an elevated location and is mounted at least partially internally of the vehicle 10. The vehicle 10 is shown on a ground level 20a/20. At the location of the vehicle 10 illustrated in FIG. 1A, the ground level 20a is substantially flat, but the ground level 20 inclines downwardly into a dip 27. A body of water is disposed in the dip 27. In the absence of a drain or tap, a static body of water typically adopts a level surface and the surface 18 of the water in the dip 27 is shown in FIG. 1A as flat and level. The depth 'H' of the water can be considered as the height 'H' of the water surface 18 above the ground level 20. It can be seen in FIG. 1A that the depth of the body of water in the dip 27 (in other words the height of the water surface 18 above ground level 20) varies at the start of the dip 27 and then adopts a constant level.

The apparatus 12a comprises at least one light emitter mounted to the vehicle 10, at least one imaging means 30 mounted to the vehicle 10 and a control unit 40. The at least one light emitter is structured and arranged to emit a first light signal 26 that is preferably shaped and which is directed toward the water surface 18 about the vehicle 10. The at least one imaging means 30 is optionally a camera and is configured and arranged to image the first light signal 26 emitted by the at least one light emitter. The control unit 40 is configured to compute from imagery or data obtained by the at least one imaging means 30 an estimation of depth 'H' of the water about the vehicle 10.

Figure 1B:
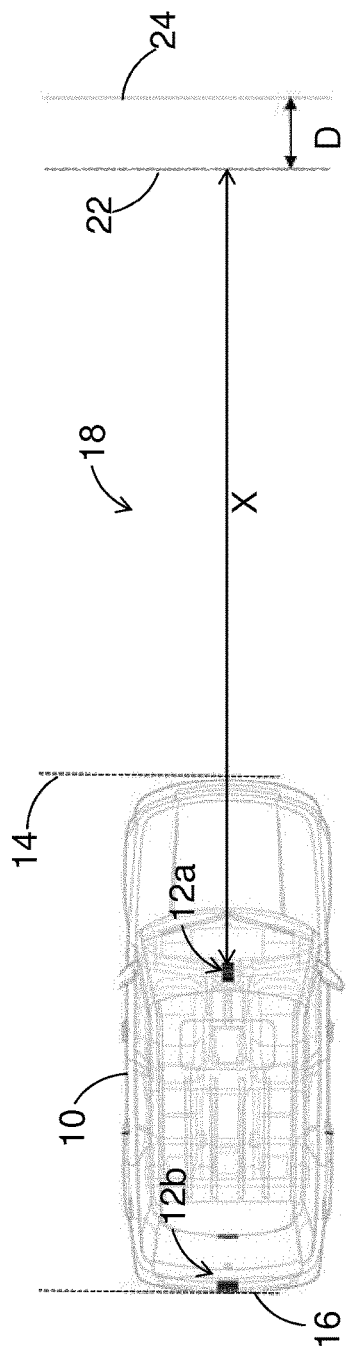
FIG. 1B is top view of the land-based vehicle of FIG. 1A.

The apparatus 12a is illustrated schematically in FIG. 2, wherein it can be seen that in the present embodiment, the at least one light emitter comprises a light source 70, an optical fibre 74, a beam shaper element 72 and a first mounting means 34a for the beam shaper element 72 and/or the optical fibre 74. A second mounting means 34b is provided for the camera 30. The light source 70 is configured to emit coherent light, which is coupled via the fibre optic 74 to a beam shaper element 72. In the illustrated embodiment, the light source 70 is an Ultraviolet (UV) laser operating at a wavelength of about 400 nm. The beam shaper element 72 comprises optical components configured and arranged such that the first light signal 26 emitted by the beam shaper element 72 is a shaped beam that is angled and focussed downwardly toward the ground in a substantially horizontal, substantially straight line 22 ahead of and extending transversely across the path in front of the vehicle 10 (this is best seen in FIG. 1B). The beam shaper element 72 may comprise any one or a combination of: a lens, a diffuser, a mask and a gobo in order to generate the emitted line of light 22. The horizontal straight beam 22 is incident on the surface of the water 18 and illuminates a line across the surface of the water 18. The camera 30 is configured to collect images in the appropriate spectral range for the light source 70 and is, in this arrangement, a UV imaging camera 30 configured to collect one or more images of a water depth estimation zone 50 (see FIG. 1A). The camera 30 is configured to collect a series of frames or images of the water depth estimation zone 50.

The control unit 40 is optionally wirelessly coupled via a communications link 42 to the camera 30. The control unit 40 is configured to receive data signals relating to the imagery obtained by the camera 30. The control unit 40 comprises a processing means (not shown) for processing the received signals. Optionally, the control unit 40 is configured to issue control signals to the camera 30, for example to activate the camera 30. The control unit 40 is coupled to the light source 70 by another communications link in order to control the operation and activation of the light source 70. Additionally the control unit 40 is optionally coupled to the first mounting means 34a by yet another communications link in order to control the position of the beam shaper element 72. Additionally, the control unit 40 is optionally coupled to the second mounting means 34b by a further communications link in order to control the position of the camera 30. The control unit 40 comprises a processing means (not shown) comprising a recognition engine which carries out analysis of the one or more images or frames or other data collected by the camera 30. The processing means is configured to recognise all or at least part of the incident light, in this example, the horizontal straight line of UV light; to recognize all or at least part of the refracted UV light, in this example, the horizontal straight line of refracted UV light; and to estimate a distance 'D' therebetween. The distance D' may be determined by counting the average or a maximum number of pixels between all or part of the incident light and a corresponding part of the refracted light. The counted pixels may be scaled using an appropriate factor or calibration to determine a distance D' in appropriate units, for example, meters. Communication signals issued by the control unit 40 and/or received by the control unit 40 are optionally issued wirelessly. In other embodiments it is envisaged that one or more of said communications links may be wired rather than wireless and/or may comprise a link to a vehicle Controller Area Network (CAN)-bus or similar vehicle-based data network.

The apparatus 12a is at least partially disposed internally of the vehicle 10. In the illustrated embodiment, all components of the apparatus 12a are disposed internally of the vehicle 10, only with the exception of at least part of the beam shaper element 72, (optionally an aperture) which preferably is able to emit a shaped light beam directly to the exterior of the vehicle 10.

Each of the first and second optional mounting means 34a, 34b are optionally electronically adjustable. As such even though the mounting height 'M' of the beam shaper element 72 can be changed, it is a known parameter. Similarly, even though the angle of incidence $\theta_{72}$ of the light beam 26 can be adjusted, it is a known parameter. The vehicle 10 of the present embodiment optionally comprises a suspension height adjustment system (also known as variable ride height). It will be recognised that the mounting height 'M' will change with adjustments in ride height and this is taken into consideration by the control unit 40 (which may receive a data signal relating to vehicle ride height via the vehicle CAN or directly from the suspension system controller). Similarly the height and orientation of the camera 30 are known.

In the water depth estimation being carried out by the apparatus 12a in FIG. 1A, the apparatus 12a is being used to estimate the height 'H' of the water surface 18 at a distance of about 'X' meters ahead of the apparatus 12a. The range of the apparatus 12a is determined by the orientation of the light emitter; and/or by the wavelength of the light source; and/or by the power of the light source; and/or by the shape of the light beam 26. The distance 'X' meters is the distance between the location at which the light beam 26 is emitted from the vehicle 10 and the location of incidence 22 of that light beam 26 on the surface of the water 18. In this example, 'X' may be about 8 m.

The location of incidence 22 (which may also be referred to as the first line of incidence 22) along which the depth 'H' is being estimated, is labelled as 22 in FIG. 1A, but is perhaps best viewed in FIG. 1B. The first line of incidence 22 is where the light beam 26 emitted by the light emitter (the light source 70, optic fibre 74 and beam shaping element 72) is incident upon and illuminates a line of the water surface 18.

The water surface 18 is an interface between a first medium, air, having a first refractive index $n_{air}$ and a second medium, water, having a second refractive index $n_{wat}$.

At the first location of incidence, a portion 28 of the first, incident, light beam 26 is refracted. This is due to the difference in the refractive index of the first medium $n_{air}$ and the refractive index of the second medium $n_{wat}$. The refracted light signal 28 is also beam like and illuminates a line along the ground level 20 of the bed of the dip 27 at a second line of refraction 24 (also referred to as second location 24).

The camera 30 is positioned and configured such that the camera 30 can collate images of the water depth estimation zone 50. One or more images obtained by the camera 30 are processed by the control unit 40 and data is obtained or derived therefrom relating to the distance 'D' between the first line of incidence 22 and the second line of refraction 24. The distance 'D' is best shown in FIG. 1B. The distance 'D' may vary along the line of refraction 24 due to a number of factors that may include: variations in the depth of the water in the region of the water depth estimation zone 50; the amount of dirt and mud in the water in the water depth estimation zone 50; the light conditions; whether the water is standing or flowing; whether the water surface is flat and still or rippling (for example due to wind); and/or the general environmental conditions (for example, the presence of rain). The control unit 40 is optionally configured to estimate the greatest water level H as determined by the greatest (maximum) imaged distance 'D'. However, in other embodiments it is envisaged that an average of the imaged distances 'D' may be taken. Such an average may be taken along the refracted line 24 and/or at selected locations along the refracted lines (for example, at four points: far right, far left and two spaced locations in between). Additionally or alternatively averages may be taken over time (in other words over a number of frames of imagery). It will be recognised that many mathematical analysis methods are available to assist in the assessment of the data collated by the camera 30 in order to provide a timely and useful estimation of height H of the water surface 18 (either in absolute terms and/or relative to the vehicle 10). An analysis that gives rise to a more conservative approach may be preferred in order to advise the driver of an estimated "worst case" or in order to implement protective actions.

Figure 1C:
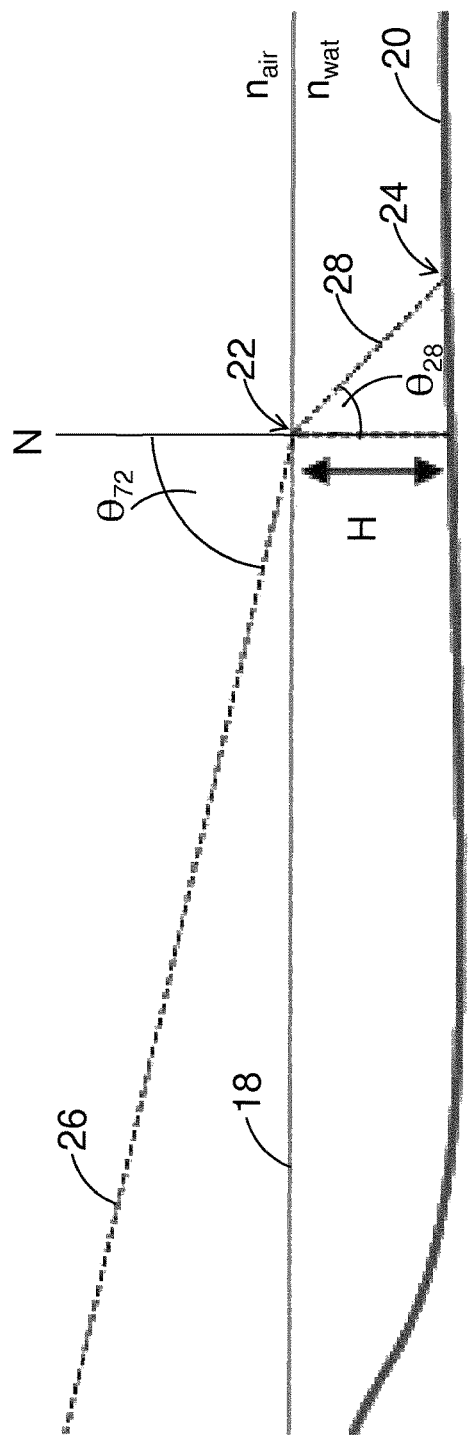
FIG. 1C is an enlarged view of a water depth estimation zone of FIGS. 1A and 1B.

To complete the estimation of the water depth H from the determined value of 'D', the control unit 40 is configured to compute, calculate or otherwise derive the angle $\theta n_{28}$, which is the angle of the refracted light signal 28 relative to a line 'N' normal to the interface 18. Optionally, this may be achieved by considering the following relationships (illustrated schematically in FIG. 1C):

$$\frac{\sin(\theta_{72})}{\sin(\theta_{28})} = \frac{n_{wat}}{n_{air}}$$

The refractive index used for air $n_{air}$ and water $n_{wat}$ in the computation may be adopted in dependence upon the frequency or wavelength of the incident light signal 26. In other envisaged embodiments the refractive index used for air $n_{air}$ and water $n_{wat}$ in the computation may be taken to be 1 and 1.3 respectively and may not necessarily depend upon the frequency or wavelength of the incident light signal 26.

From this data, the control unit 40 is configured and arranged to derive an estimation of the height 'H' of the water surface 18 above the bed of the dip 27 at the location 22. To do this the control unit 40 implements a computation based upon the following equation:

$$H = \frac{D}{\tan(\theta_{28})}$$

The estimation of 'H' or another warning relating thereto (for example "Maximum Wading Depth of Vehicle to be Reached in 'X' Meters") may be conveyed to the driver of the vehicle 10 in a number of ways. In the presently illustrated embodiment, a Human Machine Interface (HMI) device (not shown) is provided in the cabin of the vehicle 10 and takes the form of a display screen. The display screen states the estimated water level 'H' in meters and the maximum wading depth of the vehicle 10 in meters. The driver is thereby provided with clear information relating to the depth of water ahead of the vehicle 10 so that the driver can make an informed decision. For example, the driver can make the decision whether to progress into the water knowing that the depth of the water is estimated to be well below the maximum wading depth; or alternatively, the driver can decide to avoid the standing water and to take a different route; or the driver can decide to prepare the vehicle 10. For example, the driver may prepare the vehicle 10 by increasing the ride-height of the vehicle 10 (which would then increase the maximum wading depth of the vehicle); by activating a snorkel (which would then increase the maximum wading depth of the vehicle); and/or activating a wade aid control system so that the vehicle 10 can progress through the water in a controlled manner. These are examples and it will be apparent to the skilled user that the estimation of 'H' may be used by the driver and/or by one or more control systems of the vehicle 10 in a variety of ways.

Optionally in other envisaged embodiments, the estimation of 'H' or another warning relating thereto, may be relayed to the driver by: a haptic warning, a warning beep, a verbal and/or written message for example "Maximum Wading Depth of Vehicle to be Reached in 'X' meters; a graphical representation of an elevation of the vehicle with a line or colour wash demarcating the estimated water level 'H' relative to the vehicle 10.

In the illustrated example, the vehicle 10 comprises a second apparatus 12b disposed toward the rear 16 of the vehicle 10. The second apparatus 12b is configured similarly to the first apparatus 12a but is optionally only activated when the vehicle 10 has been travelling in the reverse direction. In other envisaged embodiments, the first and second apparatus 12a, 12b may be independently operable and operable simultaneously and whether either or them is activated at all and activated independently or simultaneously may be user controllable. The light source 70 for the first apparatus 12a may also be used by the second apparatus 12b which may comprise a second fibre optic (not shown) coupled to the light source 70. The common light source 70 can be located within the vehicle 10 at a location spaced from the light emitters of the first and second apparatus 12a, 12b so that it can be conveniently packaged, properly protected and/or temperature controlled whilst at the same time enabling optimum positioning of the light emitters of the first and second apparatus 12a, 12b, which in this case are the emitting end of the fibre optic 74 and beam shaping elements 72.

Advantageously the majority of the components of each apparatus 12a, 12b are disposed internally of the vehicle 10 and are thereby protected from environmental conditions, for example rain, dirt and impact.

Figure 3:
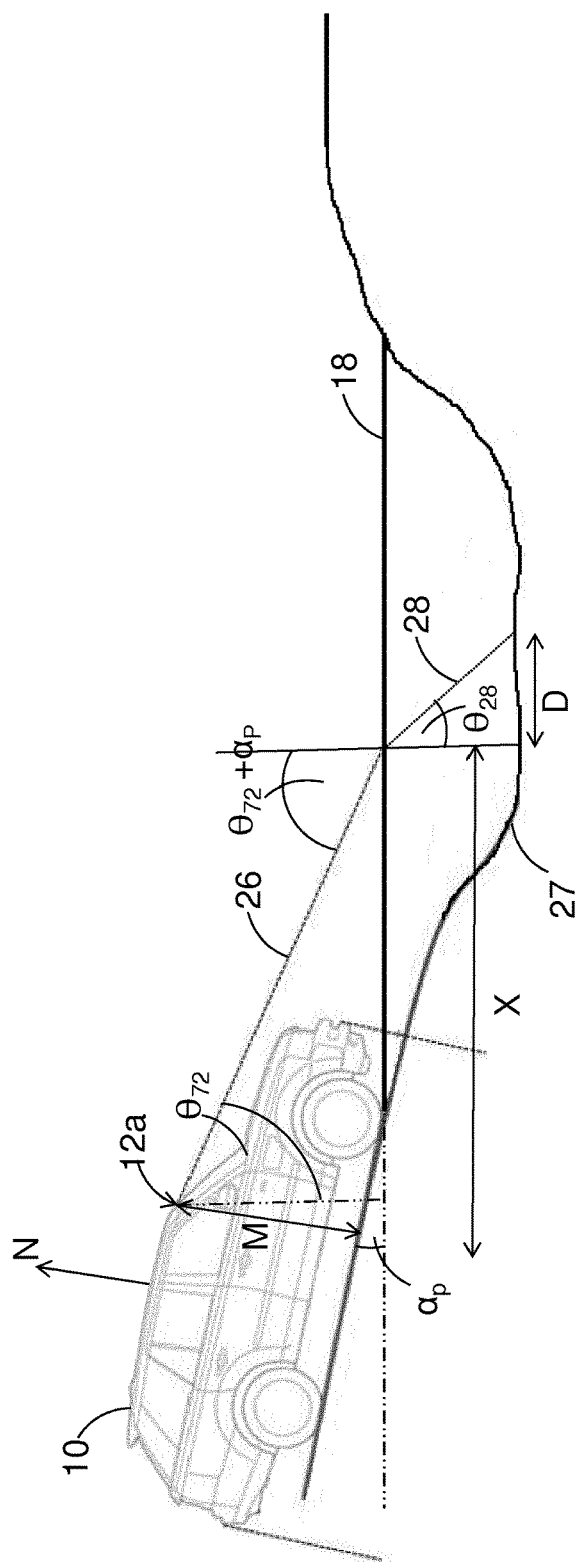
FIG. 3 is a side view of the land-based vehicle having an apparatus for water depth estimation of FIG. 1, wherein the vehicle is shown on an inclined terrain.

The control unit 40 is additionally optionally configured to account for or compensate for the changes in the attitude of the vehicle 10 on the angle of incidence $\theta_{72}$ parameter that is used in the computation described above. Reference is made to FIG. 3 wherein the vehicle 10 of FIG. 1 having the apparatus 12a is illustrated on an incline. The attitude of the vehicle 10 (in terms of roll, pitch and yaw) is known (optionally by using accelerometers and/or gyroscopes that may be present on the vehicle 10 as part of another vehicle system). The angle of inclination $\alpha_P$ of the ground surface (also referred to as pitch angle $\alpha_P$ of the vehicle 10 or longitudinal gradient of the ground surface) is shown in FIG. 3. This angle $\alpha_P$ is known and can be incorporated into the determination of the angle of refraction $\theta_{28}$ by compensating for the known angle of orientation of the light emitter $\theta_{72}$ with the pitch angle $\alpha_P$ of the vehicle 10.

It can be appreciated that various changes may be made within the scope of the present invention; for example, in other embodiments of the invention, it is envisaged that the mounting means may not be moveable and the position of the imaging apparatus (which may be a camera) and/or light signal may therefore be fixed. In some embodiments, the attitude of the vehicle 10 may not be compensated for.

Figure 4:
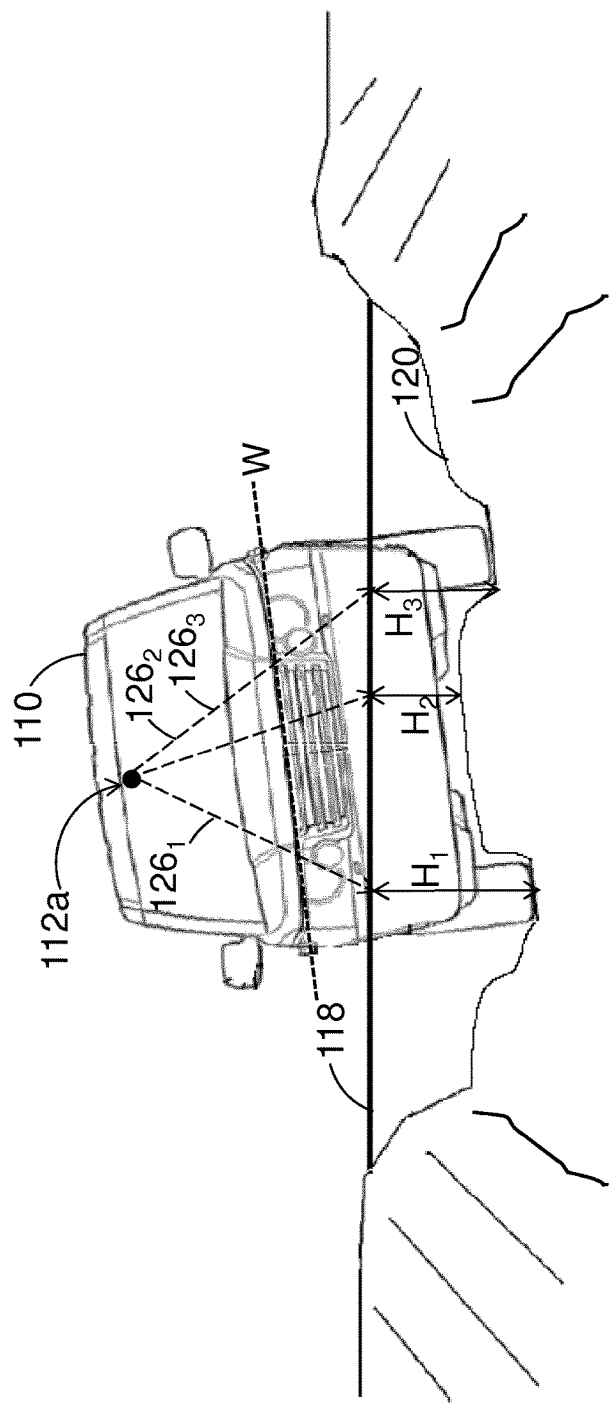
FIG. 4 is a schematic illustration from the front of a vehicle disposed on off-road terrain having an apparatus according to another embodiment of the disclosure.

In other embodiments, it is envisaged that rather than the light signal projecting a linear beam of light onto the surface of the water and the camera imaging simultaneously the area ahead of the vehicle and across the vehicle, the beam may comprise a different shape, for example a spot or arcuate line. In such embodiments, the shape of the beam may be modified by a different type of light beam shaper, for example a lens may be used to focus the light exiting the fibre optic and/or a mask or a gobo (Go Before Optics i.e. a physical template for shaping the emitted light) may be used to shape the light signal and/or a collimator may be employed. In such an embodiment, it is also envisaged that a moveable mounting means may be provided for both the light beam shaper element (or emitting end of the fibre optic if no beam shaper element is used) and the camera (unless the camera has a sufficiently wide viewing angle). The light emitter is scanned in a path across the vehicle in discrete steps. The scanned path may be an arc or may be a linear path. In this way, the mounting means may be controllable to interrogate a body of water in a number of locations. In FIG. 4 an embodiment is illustrated wherein a single apparatus 112a disposed at the front of the vehicle 110 is "scanned" across the terrain in front of the vehicle 110. The vehicle 110 is disposed at a roll angle of $\alpha_R$.

In FIG. 4 a spot-shaped incident light signal $126_1$ illuminates the water surface 118 at a first location. The control unit (not shown) controls the moveable mount and a second spot-shaped incident light signal $126_2$ illuminates the water surface 118 at a second location. The control unit (not shown) then sequentially controls the moveable mount and a third spot-shaped incident light signal $126_3$ illuminates the water surface 118 at a third location. At each of the first, second and third locations (at times $t_1$, $t_2$ and $t_3$) imagery is gathered by one or more cameras. The control unit may collate further data from camera imagery as the mounting means for the light signal is returned from the third position and is incident on the water surface at the second location before finally returning to the first location. One or more repeated "scans" may be conducted. This "scanning" of the light signal enables data to be gathered by the camera of the apparatus 112a at three (or more or less) different locations. As can be seen, the height $H_1$, $H_2$, $H_3$ of the water level 118 above the ground 120 has been estimated in relatively quick succession at three locations in front of the vehicle 110. In estimating the heights $H_1$, $H_2$, $H_3$ compensation for the roll angle $\alpha_R$ and/or the attitude of the vehicle 110 may be carried out.

The three height estimations obtained $H_1$, $H_2$, $H_3$ are significantly different with $H_1$ indicating a water level far closer to the maximum wading depth W of the vehicle 110 than the estimated height $H_2$ at the second location indicates. The control unit (not shown) is optionally configured to inform the driver of the greatest estimated water level $H_1$. In other embodiments an average of the estimations $H_1$, $H_2$, $H_3$ may be taken. Such an average may be taken over all locations where a measurement is made, at pairs (for example location 1 and location 2; location 2 and location 3) or other groups of locations and such averages may additionally or alternatively be taken over time. It will be recognised that many mathematical analysis methods are available to assist in the assessment of the data collated in order to provide timely and useful information to the driver and/or to one or more control systems of the vehicle 110. An analysis that gives rise to a more conservative approach may be preferred in order to advise the driver of an estimated "worst case".

By gathering water depth estimations in a number of locations ahead of the vehicle 110 and transversely relative to the last direction of travel of the vehicle 110, a reasonably accurate impression of the water depth of the body of water ahead of the vehicle 110 can be gathered. Such an assessment may take a little more time to obtain (owing to the time required to move the light source and image each illuminated location) but may be more simple to process since at each discrete measurement location, the recognition engine of a processor of the control unit will be attempting to identify the distance between two spots rather than two lines. However, identifying two spots from an image may in certain circumstances be less reliable than using software to "recognise" two lines from an image, especially if the if the spots are small.

Optionally, a scan of a body of water using discrete spots may be a user-selectable option. A user of the vehicle 110 may opt for a scanning water depth estimation to be carried out where it is considered that the terrain is uneven and that a single water depth estimation may give a false impression due to the difficulty in resolving the depth when the refracted line is not smooth or straight. For example, in the off-road scenario illustrated in FIG. 4, the terrain comprises deep ruts and therefore within these ruts, the water depths $H_1$ and $H_3$ are significantly greater than the depth $H_2$. The apparatus 12a of FIGS. 1 to 3 operating in the same scenario would project a horizontal straight beam of light 26 across the water surface to illuminate a line on the water surface and the camera 30 would collate imagery of the refracted line. Due to the variations in depth $H_1$, $H_2$, $H_3$ of the water (due to the bed of the dip 120 in the environment depicted in FIG. 4), the refracted line is unlikely to be straight or smooth (such as that depicted in FIG. 1B). Nevertheless, the apparatus 12a, 12b of FIG. 1A may be configured such that the processor of the control unit 40 analyses and interprets the data thereby gathered to inform the user of the vehicle of, for example, a minimum depth and/or an average depth and/or a maximum depth.

In other envisaged embodiments, it may not be essential for the camera and the light beam shaper element to be mounted proximate to one another, although in doing so, the calibration of the apparatus may be simpler compared to an apparatus wherein the camera and the light emitter are spaced apart. Indeed, in other embodiments it is envisaged that the or each camera may be disposed entirely internally of the vehicle, whereas the or each light emitter may be packaged and mounted such that the emitted light signal is emitted externally of the vehicle and does not first pass through the vehicle such that the light signal emitted by the light source will not suffer from being attenuated or reflected by part of the vehicle itself. Additionally, the camera and its lens will be protected from environmental conditions for example moisture and dirt, which may affect the performance of the camera.

In other embodiments it is envisaged that an apparatus may be mounted to the vehicle 10, 110 at different locations to that illustrated; for example, in one envisaged embodiment, the apparatus is provided at the front of the vehicle 10, 110 only and the system is not available for use to the rear of the vehicle 10, 110.

In other embodiments, an apparatus is additionally provided at each side of the vehicle. In such an arrangement, the apparatus may be provided along the same lateral axis of the vehicle. In other envisaged embodiments, the light emitter is fixedly mounted to the vehicle and its position is not readily adjustable.

In still further envisaged embodiments, more than one light emitter is provided and a single camera is structured, configured and positioned for gathering the required data from more than one water level estimation zone. Preferably, however, for the purpose of simplifying the camera image analysis in order to determine the required data and/or for the purpose of improving the accuracy of the analysis or determined data, each light emitter is associated with its own camera. In yet further envisaged embodiments, more than one camera may be provided for each light emitter. In such an arrangement two measurements of 'D' can be made at any given time and such data averaged in determining 'H'.

In other envisaged embodiments, the light emitter does not comprise a beam shaper element or an optical fibre. In such embodiments, the light source is mounted to the vehicle in such a position that the light signal output directly therefrom is incident on a surface about the vehicle. In such an embodiment, the light source may be mounted directly upon a mounting means to enable adjustment of the position of the light source (either for calibration or for scanning). In other envisaged embodiments, the light source is fixedly mounted to the vehicle and its position is not adjustable.

It will be understood that the control unit, in computing an estimation of the height 'H' of the water level above the ground, may use time-averaged data determined from more than one camera image or may use data gathered from a single image. The data used in the computation of height estimation 'H' may be rounded. Furthermore it will be understood that the order in which certain terms are computed may be adjusted and/or that a combination of calculation and/or referencing and/or approximation may be used. For example any trigonometric function mentioned in the above equations may be approximated by a fixed value or a series expansion may be computed to determine the value (such as a Taylor or Euler Series Expansion); further optionally, predefined values for each or any term in the above relationships may be listed in a look-up table (if appropriate) to be referenced during the computation of an estimation of water height 'H'. Additionally, or alternatively, or in combination, any trigonometric functions may be substituted in order to simplify their computation (and thereby optionally reduce the processing time needed in order to compute the estimation). It is envisaged that any of the trigonometric functions listed in the above equations may be computed by using an expansion series such as a Taylor Expansion Series or if appropriate an Euler Expansion Series and/or predetermined and listed in a reference or look-up table. The values, if provided in a look-up table may be linearly interpolated, quadratically interpolated, exponentially interpolated or interpolated using any other suitable mathematical method that would provide a suitable approximate value for the trigonometric function being interpolated.

In other embodiments it is envisaged that the imaging means may comprise one or more cameras and that one or more light sources may be used. Each light source may not be of the same wavelength and a camera is provided that is able to collect images in an appropriate spectral range for each of the one or more light sources. Each light source is preferably a coherent light source and in envisaged embodiments, each light source is either a laser or an LED. The term light is used to encompass electromagnetic radiation in the range from about 250 nm to about 800 nm. As such each light source may emit electromagnetic radiation in the visible or non-visible range of the electromagnetic spectrum. Further optionally, at least one light source is a laser operating in the far infra-red, infra-red, visible, Ultra-Violet (UV) or far-UV ranges. Due to the attenuation of certain wavelengths of light in water, a blue laser or a UV laser may be used having a wavelength in the range of about 450 nm to about 230 nm. Preferably, the laser may have a wavelength between 400 nm and 450 nm.

In addition to attenuation in the water and in air, the skilled person will understand that some of the first light signal 26 will also be lost as external or internal reflection. External reflection occurs at water surface 18 when first light signal 26 passes from the air to the water, and internal reflection occurs at water surface 18 when first light signal 26 passes back out of the water and into the air. The proportion of first light signal 26 that is lost to internal and external reflection may be reduced by making first light signal 26 vertically polarised (with respect to the orientation of the vehicle in normal use). This is because a greater proportion of the horizontal component of light incident on a non-metallic horizontal surface (such as that of water) is reflected than the vertical component, so using light having only a vertical component reduces reflection. Using a vertically polarised light signal has the additional advantage that a filter which allows only vertically polarised light to pass through may be provided on imaging means 30, thereby removing a significant proportion of the interference caused by ambient light and improving the accuracy with which the system can determine the locations of the first line of incidence 22 and the second line of refraction 24. This improves the accuracy of the calculation of water depth H.

The terms "scan" and "scanned" as used herein should be interpreted to include continuous movement of the light source and continuous gathering and/or analysis of data and a stepped movement of the light source and an intermittent analysis of data.

Additional data optionally obtained from other vehicle control systems of the vehicle for example, but not limited to: the selected terrain mode (OFF-ROAD, ON-ROAD); the vehicle driving direction (forwards, reverse); rain sensor data; other external camera imagery; the attitude of the vehicle (roll, yaw and pitch); and ride-height, may be used by the system of the present invention. Information from other vehicle systems may be transmitted directly to the system of the present invention from the vehicle control system having that data (for example, the suspensions system) or may be transmitted via an associated controller via a vehicle CAN-bus or similar vehicle-based data network. Such data may be used to compensate for vehicle orientation (height and attitude) when estimating the height of the surface of the water H; and/or may be used by the control unit 40 to determine whether the system is available for use. The system may not be available if it is considered that due to certain conditions, for example rain sensed by a rain sensor; and/or light conditions sensed by an external camera, the data obtained may not be reliable.

The invention claimed is:

1. An apparatus for estimating depth of water surrounding a wading vehicle, the apparatus comprising at least one light emitter having one or more coherent and vertically polarised light sources, at least one imaging means and a control unit, the at least one light emitter being structured and arranged such that a first light signal emitted by the at least one light emitter is directed towards a water surface, the at least one imaging means being configured and arranged for imaging the first light signal and the control unit being configured to compute from imagery obtained by the at least one imaging means an estimation of a wading depth of water, wherein the apparatus is configured to provide a warning in dependence on the estimated depth of the water being equal to or greater than a threshold wading depth, the threshold wading depth being 150 mm or more.

2. An apparatus according to claim 1 wherein the at least one imaging means comprises at least one camera.

3. An apparatus according to claim 2 wherein the apparatus comprises a first camera configured to detect one or more locations of incidence of the first light signal on a water surface and wherein the first or another camera is configured to detect one or more locations of incidence of a second light signal on a ground surface, wherein the second light signal is a refracted portion of the first light signal and wherein the control unit derives a height of the water surface above the ground level in dependence upon the distance between the one or more locations of incidence of the first light signal on the water surface and the one or more locations of incidence of a corresponding refracted second light signal on the ground surface.

4. An apparatus according to claim 3 wherein the distance is determined by said control unit by counting a maximum or average number of pixels between the one or more locations of incidence of the first light signal on the water surface and the one or more locations of incidence of a corresponding refracted second light signal on the ground surface.

5. An apparatus according to claim 1 wherein the first light signal is shaped such that said one or more locations of incidence of the first light signal on the water surface is shaped as a line.

6. A method of estimating the depth of water at a location adjacent a vehicle, the method comprising:
   (i) emitting a first light signal toward a water surface at the location adjacent the vehicle, wherein the first light signal is emitted from a coherent and vertically polarized light source;
   (ii) imaging the first light signal;

(iii) computing from said imagery an estimation of a wading depth of water at the location adjacent the vehicle; and (iv) providing a warning in dependence on the estimated depth of the water being equal to or greater than a threshold wading depth, the threshold wading depth being 150 mm or more.

7. A method according to claim 6 wherein step (ii) comprises imaging one or more locations of incidence of the first light signal on a water surface and imaging one or more locations of incidence of a second light signal on a ground surface, wherein the second light signal is a refracted portion of the first light signal and wherein step (iii) comprises deriving an estimation of the height of the water surface above the ground level in dependence upon a detected distance between the one or more locations of incidence of the first light signal on the water surface and the one or more locations of incidence of a corresponding refracted second light signal on the ground surface.

8. A method according to claim 6 wherein the first light signal is a shaped light signal such that the one or more locations of incidence of the first light signal on the water surface is shaped as a line.

9. An apparatus according to claim 1 comprising a moveable mounting means for mounting a portion of the at least one light emitter to a vehicle and wherein the mounting means moves the portion of the at least one light emitter to change the position relative to the vehicle from which the first light signal is emitted.

10. An apparatus according to claim 9 wherein the one or more coherent light sources comprises one coherent light source, and the moveable mounting means comprises a first moveable mounting means, the portion of the at least one light emitter being mounted via the first moveable mounting means to the front of the vehicle and wherein the apparatus is structured and arranged such that the first light signal is scanned in front of the vehicle in: a linear pattern or in a arcuate pattern.

11. An apparatus according to claim 10 wherein the apparatus comprises a second light emitter for emitting a further light signal from the vehicle, a portion of the second light emitter being mounted via a second moveable mounting means to the rear of the vehicle and wherein the apparatus is structured and arranged such that a further light signal is scanned to the rear of the vehicle in: a linear pattern or in a arcuate pattern.

12. An apparatus according to claim 9 wherein the apparatus is positioned on the vehicle such that the apparatus is suitable for estimating the depth of a body of water ahead of the direction of travel of the vehicle, in front of the vehicle, to the rear of the vehicle and/or to one or both of the sides of the vehicle.

13. A land-based automotive vehicle comprising an apparatus as claimed in claim 1, wherein the at least one light emitter and the at least one imaging means are mounted to the vehicle, the at least one light emitter being structured and arranged to emit a first light signal directed toward a water surface at a location adjacent to the vehicle, and wherein the at least one imaging means is configured to image the first light signal emitted by the at least one light emitter and the control unit is configured to compute from imagery obtained by the at least one imaging means an estimation of depth of the water at the location adjacent to the vehicle.

14. A land-based automotive vehicle according to claim 13 wherein the first light signal is shaped such that said one or more locations of incidence of the first light signal on the water surface is shaped as a line and the line is a horizontal straight line spaced from the front end of the vehicle or spaced from the rear end of the vehicle.

15. An apparatus according to claim 1, wherein the imaging means is provided with a filter that only allows vertically polarised light to pass therethrough.

16. An apparatus for estimating depth of water surrounding a wading vehicle, the apparatus comprising at least one light emitter, at least one imaging means, and a control unit, the at least one light emitter comprising one or more light sources being structured and arranged such that a first light signal emitted by the at least one light emitter is directed towards a water surface, the at least one imaging means being configured and arranged for imaging the first light signal and the control unit being configured to compute from imagery obtained by the at least one imaging means an estimation of a wading depth of water, wherein the one or more light sources are vertically polarized; wherein the apparatus is configured to provide a warning in dependence on the estimated depth of the water being equal to or greater than a threshold wading depth, the threshold wading depth being 150 mm or more.

17. An apparatus according to claim 16, wherein the imaging means is provided with a filter that only allows vertically polarised light to pass therethrough.

18. A land-based automotive vehicle comprising a hood and apparatus as claimed in claim 1, wherein the at least one light emitter is mounted to the vehicle at a location above the hood such that the first light signal emitted by the at least one light emitter is directed towards the water surface from above the hood.

19. A method according to claim 6, wherein step (i) comprises emitted the first light signal toward a water surface from a location above the hood of the vehicle.

20. A method according to claim 6, wherein the first light signal emitted in step (i) is emitted from a coherent light source comprising one or more or a combination of: a blue laser; a green laser; and a UV laser.

21. An apparatus according to claim 1, wherein the one or more coherent light sources comprises one or more or a combination of: a blue laser; a green laser; and a UV laser.

* * * * *